(12) United States Patent
Aleksic et al.

(10) Patent No.: US 12,327,552 B2
(45) Date of Patent: Jun. 10, 2025

(54) SELECTIVELY INVOKING AN AUTOMATED ASSISTANT BASED ON DETECTED ENVIRONMENTAL CONDITIONS WITHOUT NECESSITATING VOICE-BASED INVOCATION OF THE AUTOMATED ASSISTANT

(71) Applicant: Google LLC, Mountain View, CA (US)

(72) Inventors: Petar Aleksic, Jersey City, NJ (US); Pedro Jose Moreno Mengibar, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 680 days.

(21) Appl. No.: 17/251,481

(22) PCT Filed: Jan. 17, 2020

(86) PCT No.: PCT/US2020/014145
§ 371 (c)(1),
(2) Date: Dec. 11, 2020

(87) PCT Pub. No.: WO2021/145895
PCT Pub. Date: Jul. 22, 2021

(65) Prior Publication Data
US 2022/0310089 A1   Sep. 29, 2022

(51) Int. Cl.
*G10L 15/22*       (2006.01)
*G06F 3/16*        (2006.01)
(Continued)

(52) U.S. Cl.
CPC .............. *G10L 15/22* (2013.01); *G06F 3/167* (2013.01); *G10L 15/063* (2013.01);
(Continued)

(58) Field of Classification Search
CPC . G06F 3/00; G06F 3/167; G10L 15/00; G10L 15/22; G10L 15/063; G10L 15/1815; G10L 2015/223; G10L 2015/228
See application file for complete search history.

(56) References Cited

U.S. PATENT DOCUMENTS

| | | | |
|---|---|---|---|
| 10,199,051 | B2 | 2/2019 | Binder et al. |
| 2012/0115501 | A1 | 5/2012 | Zheng |

(Continued)

FOREIGN PATENT DOCUMENTS

| | | |
|---|---|---|
| CN | 108268587 | 7/2018 |
| CN | 109891497 | 6/2019 |

(Continued)

OTHER PUBLICATIONS

European Patent Office; International Search Report and Written Opinion of PCT Ser. No. PCT/US2020/014145; 12 pages; dated Oct. 14, 2020.

(Continued)

*Primary Examiner* — Daniel C Washburn
*Assistant Examiner* — Sean E Serraguard
(74) *Attorney, Agent, or Firm* — Gray Ice Higdon

(57) ABSTRACT

Implementations set forth herein relate to an automated assistant that is invoked according to contextual signals—in lieu of requiring a user to explicitly speak an invocation phrase. When a user is in an environment with an assistant-enabled device, contextual data characterizing features of the environment can be processed to determine whether a user intends to invoke the automated assistant. Therefore, when such features are detected by the automated assistant, the automated assistant can bypass requiring an invocation phrase from a user and, instead, be responsive to one or more assistant commands from the user. The automated assistant can operate based on a trained machine learning model that (Continued)

is trained using instances of training data that characterize previous interactions in which one or more users invoked or did not invoke the automated assistant.

13 Claims, 10 Drawing Sheets

(51) Int. Cl.
*G10L 15/06* (2013.01)
*G10L 15/18* (2013.01)

(52) U.S. Cl.
CPC .... *G10L 15/1815* (2013.01); *G10L 2015/223* (2013.01); *G10L 2015/228* (2013.01)

(56) References Cited

U.S. PATENT DOCUMENTS

| | | | |
|---|---|---|---|
| 2016/0155443 A1* | 6/2016 | Khan | G06F 3/167 704/275 |
| 2017/0272812 A1* | 9/2017 | Yu | G06F 3/0416 |
| 2018/0025733 A1* | 1/2018 | Qian | G10L 25/78 704/275 |
| 2018/0173494 A1* | 6/2018 | Choi | G10L 15/30 |
| 2018/0233139 A1* | 8/2018 | Finkelstein | G10L 25/51 |
| 2019/0066680 A1 | 2/2019 | Woo et al. | |
| 2019/0187787 A1* | 6/2019 | White | G06F 3/167 |
| 2019/0311720 A1* | 10/2019 | Pasko | G06F 3/167 |

FOREIGN PATENT DOCUMENTS

| | | | |
|---|---|---|---|
| EP | 2950307 | 12/2015 | |
| WO | 2018110818 | 6/2018 | |
| WO | WO-2019209255 A1 * | 10/2019 | G06F 3/167 |

OTHER PUBLICATIONS

China National Intellectual Property Administration; Notification of First Office Action issued in Application No. 20280093495.0; 30 pages; dated Dec. 3, 2024.

China National Intellectual Property Administration; Notice to Grant issued in Application No. 20280093495.0; 4 pages; dated Apr. 18, 2025.

* cited by examiner

SELECTIVELY INVOKING AN AUTOMATED ASSISTANT BASED ON DETECTED ENVIRONMENTAL CONDITIONS WITHOUT NECESSITATING VOICE-BASED INVOCATION OF THE AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, responsiveness of an automated assistant can be limited to scenarios in which a user explicitly invokes the automated assistant. For example, a user must often explicitly invoke an automated assistant before the automated assistant will fully process a spoken utterance. Some user interface inputs that can invoke an automated assistant via a client device can include a hardware and/or virtual button at the client device for invoking the automated assistant (e.g., a tap of a hardware button, a selection of a graphical interface element displayed by the client device). Many automated assistants can additionally or alternatively be invoked in response to one or more particular spoken invocation phrases, which are also known as "hot words/phrases" or "trigger words/phrases" (e.g., an invocation phrase such as, "Hey, Assistant"). As a result of explicit invocations, a user typically devotes time to invoking their automated assistant before directing their automated assistant to assist with particular tasks. This can lead to interactions between a user and the automated assistant being unnecessarily prolonged, and can lead to corresponding prolonged usage of various computational and/or network resources.

SUMMARY

Implementations set forth herein relate to training and/or implementation of one or more machine learning models that can be used for at least selectively bypassing an explicit invocation of an automated assistant, which may otherwise be required prior to invoking an automated assistant to perform various tasks. Put another way, output generated using the machine learning model(s) can be used to determine when an automated assistant should be responsive to a spoken utterance, when the spoken utterance is not preceded by an explicit invocation of the automated assistant. In order to determine whether to invoke the automated assistant based on environmental conditions, a trained machine learning model can be employed when processing a variety of different signals to generate output that indicates whether explicit invocation of an automated assistant should be bypassed. For example, the trained machine learning model can be used to process data characterizing an environment in which a user may interact with an automated assistant. In some implementations, a signal vector can be generated to characterize operating states of a variety of different devices within the environment. These operating states can be indicative of an intention of the user to invoke an automated assistant, and can therefore effectively substitute for a spoken invocation phrase. In other words, when the user is in a particular environment in which the user would normally ask the automated assistant to perform a particular action, the trained machine learning model can be used to process contextual data characterizing the environment, the user, a time of day, a location, and/or any other characteristic associated with the environment and/or the user. The processing of the contextual data can result in output (e.g., a probability) that indicates whether the user will request an assistant action be performed. This probability can be used to cause the automated assistant to require, or bypass requiring, the user to provide an invocation phrase (or other explicit invocation) before being responsive to an assistant command.

As a result of an automated assistant being invoked without necessitating that an invocation phrase (or other explicit invocation) be initially detected, various computational and power resources can be preserved. For example, a computing device, that necessitates an explicit spoken invocation phrase before every assistant command, can consume more resources than another computing device that does not necessitate an explicit spoken invocation phrase before every assistant command. Resources such as power and processing bandwidth can be preserved when the computing device is no longer continually monitoring for an invocation but, rather, processing contextual signals that are already available. Further resources, such as processing bandwidth and client device power resources, can be preserved when interactions between the user and the automated are shortened as a result of no longer necessitating an invocation phrase to be provided by the user prior to satisfying most assistant commands. For example, user interaction with a client device, that incorporates an automated assistant, can be shorter in duration as a result of the user at least selectively not needing to preface assistant commands with a spoken invocation phrase or other explicit invocation input(s).

Instances of training data used to train the machine learning model can be based on interactions between one or more users and one or more automated assistants. For example, in at least one interaction, a user may provide an invocation phrase (e.g., "Hey, Assistant . . . ") followed by an assistant command (e.g., "Secure my alarm system."), and another invocation phrase followed by another assistant command (e.g., "Also . . . Hey, Assistant, play some music."). Both invocation phrases and both assistant commands may have been provided within a threshold period of time (e.g., 1 minute) in a particular environment, thereby indicating a likelihood that the user may, again, issue those assistant commands at a subsequent point in time, and within the threshold period of time, in the same environment. In some implementations, an instance of training data generated from this scenario can characterize one or more features of the particular environment as having a positive or a negative correlation to the invocation phrases and/or the assistant commands. For example, an instance of training data can include training instance input that corresponds to the features of the particular environment and training instance output of "1" or other positive value that indicates explicit invocation of the assistant should be bypassed.

In some implementations, properties of one or more computing devices associated with an environment in which the user interacted with the automated assistant can be a basis for bypassing invocation phrase detection. For example, an instance of training data can be based on a scenario in which a user was interacting with their automated assistant while in a kitchen of their home. The kitchen may include one or more smart devices, such as a refrigerator, an oven, and/or a tablet device that are controllable via the automated assistant. One or more properties and/or states of the one or more smart devices can be identifiable when the user provides an invocation phrase followed by an assistant command. These properties and/or operating states can be used as a basis from which to generate an instance of training data. For example, the instance of training data can include training instance input that reflects those properties and/or operating states, and training instance output of "1" or other positive value that indicates explicit invocation of the assistant should be bypassed. For example, the tablet device in the kitchen can be operating in a low-power mode when the user provides a first invocation phrase and a first assistant command such as, "Assistant, preheat the oven to 350 degrees." The instance of training data that is generated from this scenario can be based on the tablet device being in a low-power mode and an oven initially being off when the user provides the assistant command in the kitchen for preheating the oven. In other words, the instance of training data can provide a positive correlation between the device states (e.g., the tablet device state and the oven device state) and the assistant command(s) (e.g., "preheat the oven"). Thereafter, a machine learning model, that is trained using the instance of training data, can be used to determine whether to bypass requiring an invocation phrase (or other explicit input) from the user to invoke the automated assistant. For example, the automated assistant can be subsequently invoked, based on the trained machine learning model, when a similar context arises in the kitchen or another similar environment in which the user can interact with their automated assistant. For instance, contextual features can be processed using the trained machine learning model to generate a predicted output, and requiring of explicit input can be bypassed if the predicted output satisfies a threshold (e.g., is greater than a threshold of 0.7, or other value, where the predicted output is a probability).

In some implementations, another instance of training data can be generated based on another scenario in which the tablet device is playing music and the oven is operating at 350 degrees Fahrenheit. For example, the other instance of training data can provide a correlation between one or more features of an environment, operating states of various devices, non-invocation actions from one or more users, signals from one or more sensors (e.g., a proximity sensor), and/or the user not providing a subsequent assistant command within a threshold period of time. For example, the user can provide an invocation phrase and an assistant command such as, "Assistant, turn off the oven." Subsequently, and within a particular threshold period of time, the user can refrain from providing another invocation phrase and another assistant command. As a result, an instance of training data can be generated based on the tablet device playing music, the automated assistant being directed to turn off the oven, and the user not issuing a subsequent invocation phrase or a subsequent assistant command—at least not within a threshold period of time. For example, an instance of training data can include training instance input that corresponds to the features of the particular environment and training instance output of "0" or other negative value that indicates explicit invocation of the assistant should be bypassed. This instance of training data can be used to train one or more machine learning models for determining whether to bypass detecting invocation phrases from one or more users in certain contexts and/or environments.

In some implementations, various instances of training data can be generated using data from a variety of different devices that include a variety of different sensors and/or techniques for identifying features of an environment. As an example, training data can be generated, with prior permission from a user, from visual data that characterizes user proximity, posture, gaze, and/or any other visual feature(s) of a user in an environment before, during, and/or after the user provides an assistant command. Such features, alone or in combination, can be indicative of whether or not a user is interested in invoking an automated assistant. Furthermore, a machine learning model trained using such training data can be employed by an automated assistant when determining whether or not invoke the automated assistant based on certain environmental features (e.g., features exhibited by one or more users, computing devices, and/or any other feature of an environment).

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
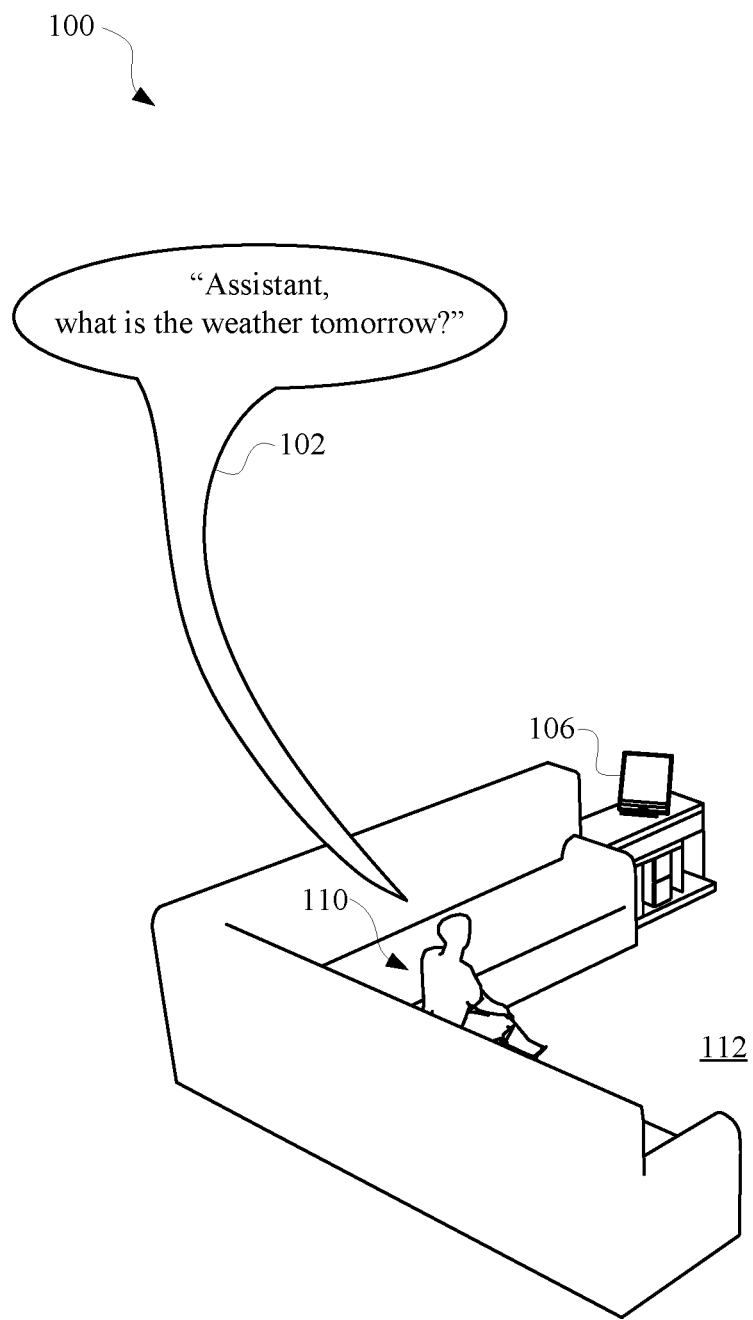
FIG. 1A and FIG. 1B illustrate views of a scenario from which an instance of training data is generated for training one or more machine learning models for bypassing invocation phrase detection by an automated assistant.
Figure 1B:
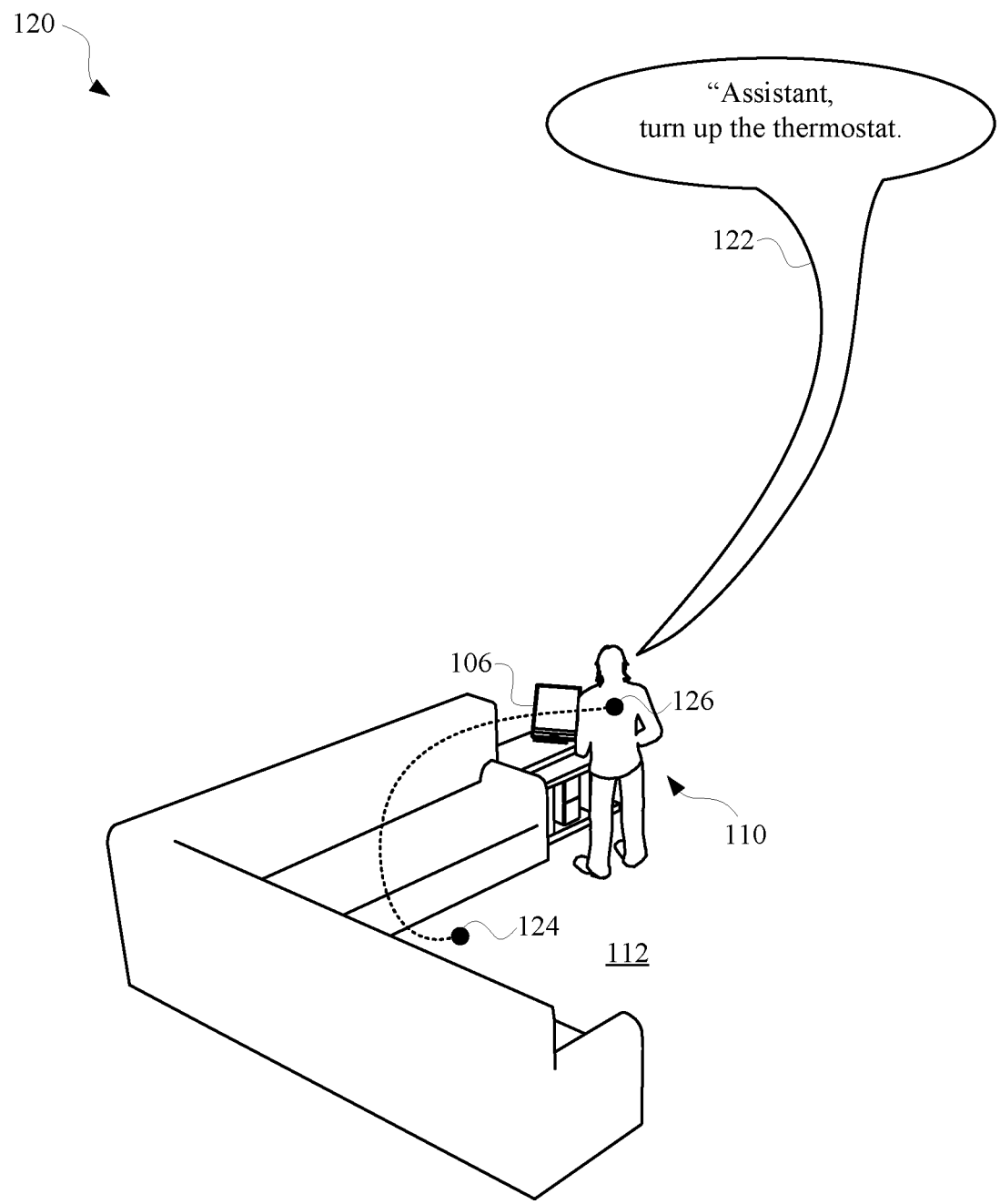

FIG. 1A and FIG. 1B illustrate a view 100 and a view 120, respectively, of a scenario from which an instance of training data is generated for training one or more machine learning models for bypassing necessitating invocation phrase detection by an automated assistant. The machine learning models can be used for determining whether to bypass invocation phrase detection at an automated assistant. For example, an invocation phrase can often be used to invoke an automated assistant and can contain one or more words or phrases, such as, "Ok, assistant." In response to a user 110 providing an invocation phrase, a computing device 106 that provides access to the automated assistant can provide an indication that the user 110 has invoked the automated assistant. Thereafter, the user 110 can be provided an opportunity to speak or otherwise input one or more assistant commands to the automated assistant, in order to cause the automated assistant to perform one or more operations.

In some implementations, and in lieu of the automated assistant and/or the computing device 106 requiring the user to provide the invocation phrase, the computing device 106 and/or the automated assistant can process contextual data characterizing one or more features of an environment 112 in which a user 110 is located. The contextual data can be generated based on data from a variety of different sources and can be processed using one or more trained machine learning models. In some implementations, the contextual data can be generated independent of whether the user provided an invocation phrase and/or an assistant command to the automated assistant. In other words, regardless of whether the user provided an invocation phrase within a particular environment, the contextual data can be processed, with prior permission from the user, to determine whether or not to require the user to provide an explicit spoken invocation phrase before being responsive to input(s) from the user. When the contextual data is processed and is indicative of a scenario in which the user 110 may otherwise provide an invocation phrase, the automated assistant can be invoked and await further commands from the user without the user being required to explicitly speak the invocation phrase. This can preserve computational resources that may otherwise be consumed constantly determining whether a user is providing an invocation phrase.

In some implementations, instances of training data for the machine learning model can be based on interactions between one or more users and one or more automated assistants. For example, a particular user 110 can provide a spoken utterance 102 such as, "Assistant, what is the weather tomorrow?" The user 110 can provide the spoken utterance 102 when the user is located in the environment 112 with the computing device 106. In some implementations, and with prior permission from the user 110, the computing device 106 can determine one or more features of the environment such as, but not limited to, a posture of the user 110, a proximity of the user 110 relative to the computing device 106 and/or another computing device, an amount of noise in the environment 112 relative to the spoken utterance 102, a presence of one or more other persons in the environment 112, a lack of presence of a particular user within the environment 112, a facial expression of the user 110, a trajectory of the user 110, hand/or any other features of the environment 112.

FIG. 1B illustrates a view 120 of the user 110 moving from a first user position 124 to a second user position 126, and subsequently providing another spoken utterance 122. The scene provided in FIG. 1B can be subsequent in time relative to the scene illustrated in FIG. 1A. Features of this scenario in which the user provided two spoken utterances at two different positions can be characterized by contextual data generated by a computing device 106. Furthermore, the contextual data can characterize a time at which the user 110 provided the first invocation phrase, the first assistant command, the second invocation phrase, and the second assistant command (e.g., " . . . turn up the thermostat."). In some implementations, the contextual data can be void of any data characterizing an invocation phrase from one or more users and/or an assistant command from one or more users. The contextual data can be processed to generate an instance of training data that provides a positive correlation between the user 110 providing back to back assistant commands around a time that the user moved from the first user position 124 to the second user position 126. Additionally, or alternatively, the contextual data can characterize the first assistant command, (e.g., "What is the weather tomorrow?") as having a positive correlation to the second assistant command (e.g., "Turn up the thermostat"), when the user 110 is in the environment 112 and moves more proximate to the computing device 106 after providing the first assistant command.

In some implementations, the trained machine learning model can be a neural network model, and an instance of training data can include input data characterizing one or more features of the environment and/or scenarios characterized in FIG. 1A and FIG. 1B. The instance of training data can also include output data characterizing user inputs and/or gestures made by the user 110 within the environment and/or within the scenario characterized by FIG. 1A and FIG. 1B. In this way, when the automated assistant employs the trained machine learning model, contextual data characterizing a separate scenario can be processed using the trained machine learning model in order to determine whether to bypass necessitating an invocation phrase before activating the automated assistant or, alternatively, necessitating the invocation phrase before activating the automated assistant. In some implementations, the contextual data can be based on a separate environment that corresponds to the same geographic location as the environment 112, except that the separate environment has different features and/or environmental conditions (e.g., the user 110 is in a different location, devices are exhibiting different states, etc.).

Figure 2A:
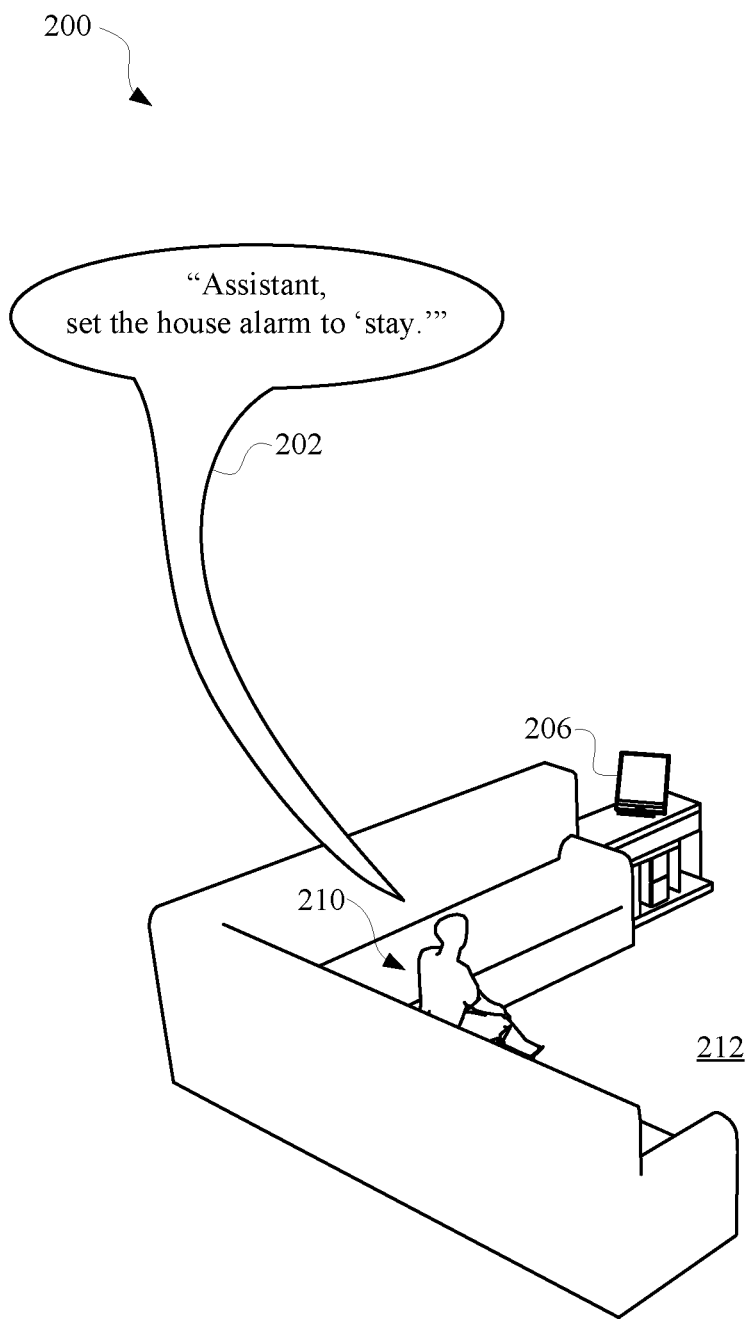
FIG. 2A and FIG. 2B illustrate views of training data being generated based on a user providing a spoken utterance to an automated assistant, and then subsequently walking away from a computing device that received the spoken utterance.
Figure 2B:
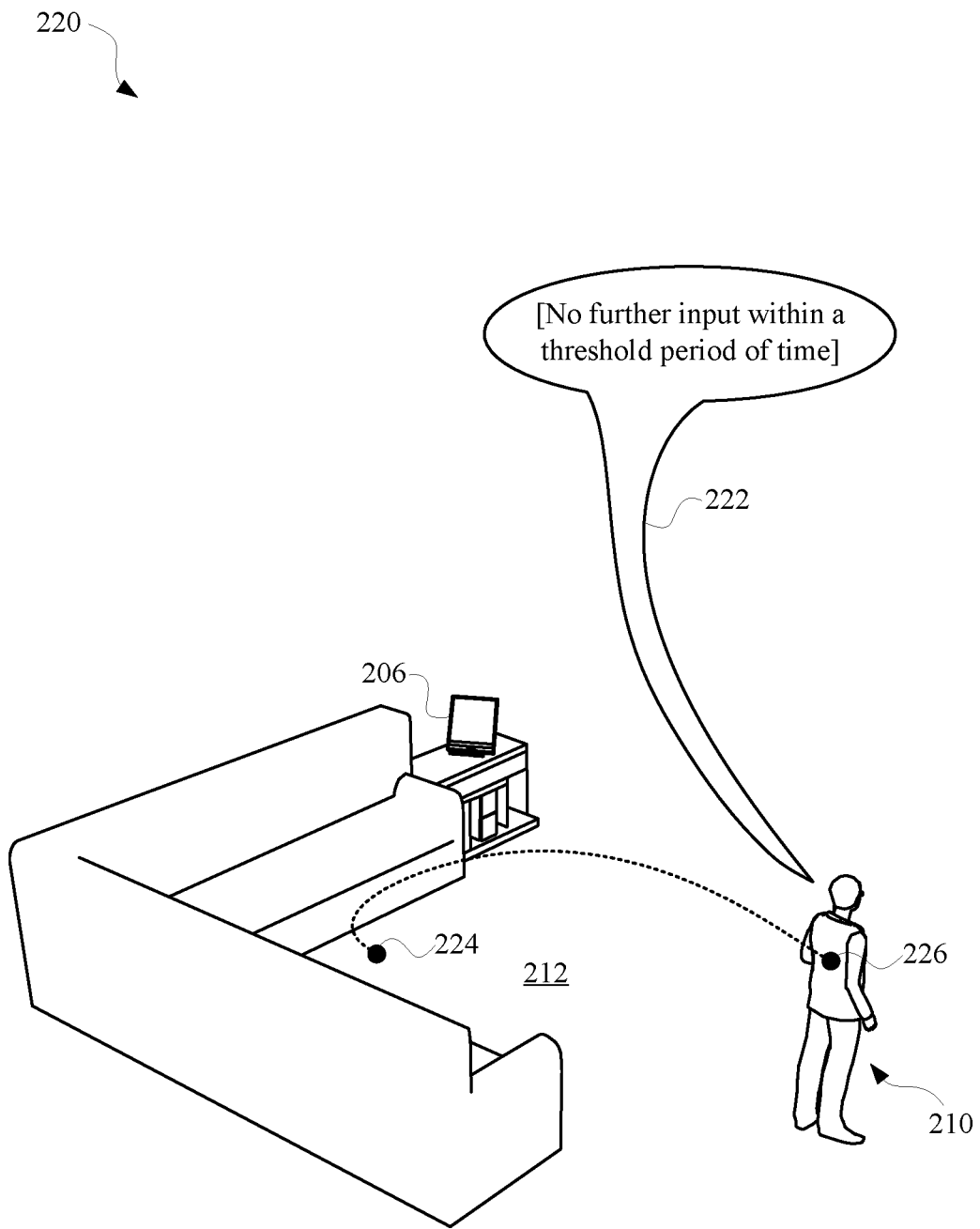

FIG. 2A and FIG. 2B illustrate a view 200 and a view 220 of training data being generated based on a user 210 providing a spoken utterance 202 to an automated assistant, and then subsequently walking away from a computing device 206 that received the spoken utterance 202. Features of this scenario can be characterized by contextual data and processed in order to generate the training data, which can be used to train one or more machine learning models for determining whether to bypass invocation phrase detection for an automated assistant. In other words, the scenario characterized by FIG. 2A and FIG. 2B provides an instance in which there is a negative correlation between features of the environment 212 and the user 210 providing back-to-back assistant commands. Training data generated based on this scenario can be used to train the machine learning model that can allow an automated assistant to more readily determine when to continue detecting invocation phrases from the user, rather than bypassing invocation phrase detection.

FIG. 2A illustrates a view 200 of the user 210 providing a spoken utterance 202 such as, "Assistant, set the house alarm to 'stay.'" The computing device 206 can receive a spoken utterance 202 and generate audio data, which can be processed for determining whether the user 210 provided an invocation phrase and/or an assistant command. Furthermore, the computing device 206 and/or any other computing device located in an environment 212 can be used to generate contextual data characterizing features of the environment 212 in which the user 210 provided the spoken utterance 202. For example, the contextual data can characterize a time of day in which the user provided the spoken utterance 202, an expression of the user 210 with prior permission from the user, a proximity of the user 210 to the computing device 206, a gaze of the user 210 relative to the computing device 206, and/or any other object within the environment 212, and/or any other feature of the environment.

Subsequent to providing the spoken utterance 202, the user 210 can relocate from a first position 224 to a second position 226. As illustrated in FIG. 2A, the user 210 can provide the spoken utterance 202 while in the first position 224, and then move to the second position 226 where the user 210 may elect to provide no further input within a threshold period of time (as indicated by status 222). The computing device 206 can determine that the user 210 provided no further input within the threshold period of time and generate training data characterizing this scenario. Particularly, the training data can be based on contextual data characterizing features of the environment over the time period captured in FIG. 2A and FIG. 2B. The contextual data can characterize the spoken utterance 202 from the user 210, the first position 224 of the user 210, the second position 226 of the user 210, timestamps corresponding to each position, a gaze of the user 210 at each position, and/or any other feature of the scenario in which the user 210 provided the spoken utterance 202 and subsequently provided no further input in the same environment 212 (or at least, for example, not until returning to the environment 212).

The training data can include a training input that is correlated to a training output. The training input can be, for example, a signal vector that is based on the contextual data, and the training output can indicate that the user 210 provided no further input in the scenario characterized by the contextual data (e.g., the training output can be a "0" or other negative value). A machine learning model trained according to this training data, and the training data associated with FIG. 1A and FIG. 1B, can be used to determine a probability that a user will provide an invocation phrase under certain circumstances. An automated assistant and/or computing device can therefore use the trained machine learning model in order to be responsive to contextual signals without necessarily requiring an invocation phrase from the user.

Figure 3A:
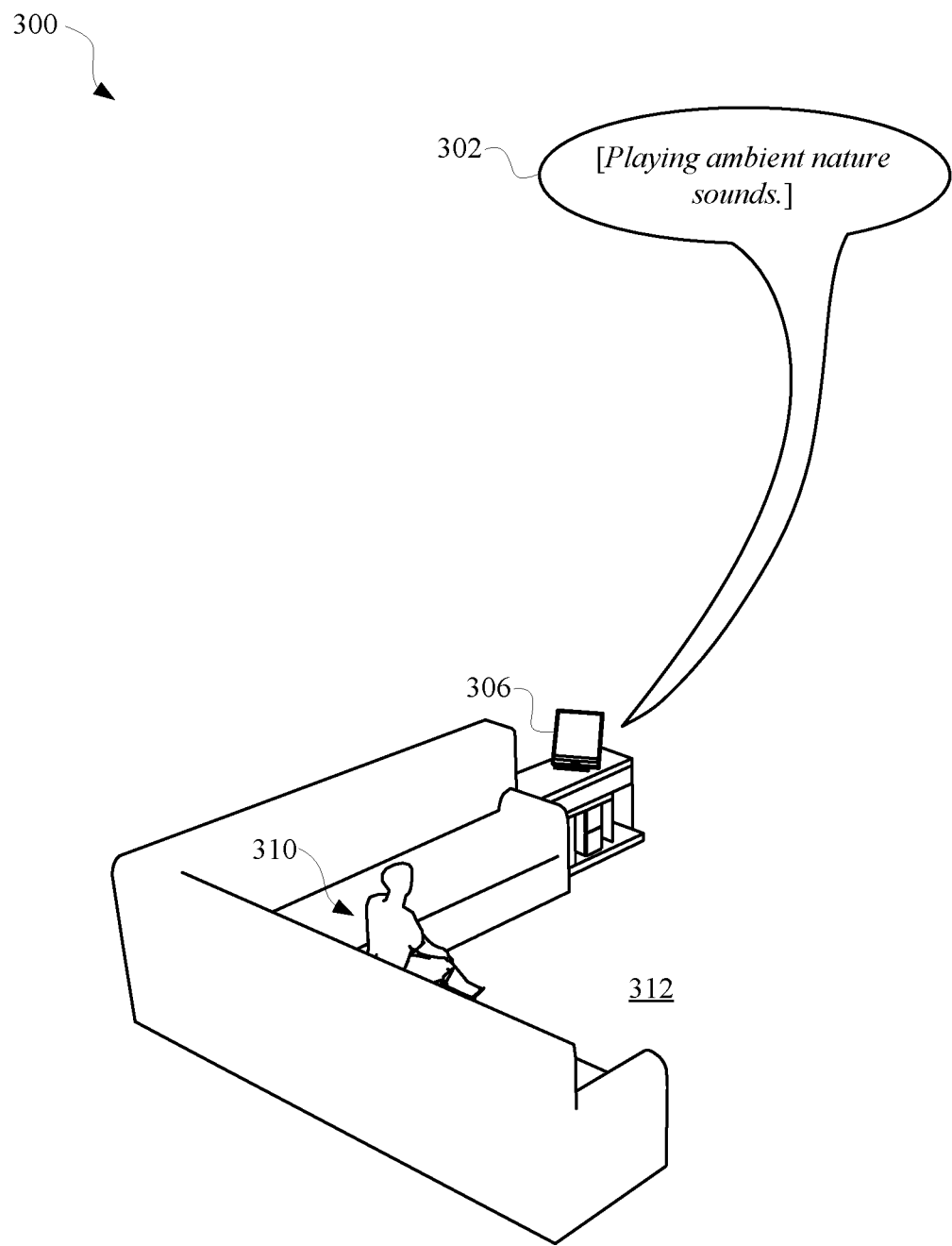
FIG. 3A, FIG. 3B, and FIG. 3C illustrate a scenario in which an automated assistant employs a trained machine learning model for determining when to be invoked for receiving assistant commands—in lieu of requiring a spoken invocation phrase before being invoked.
Figure 3B:
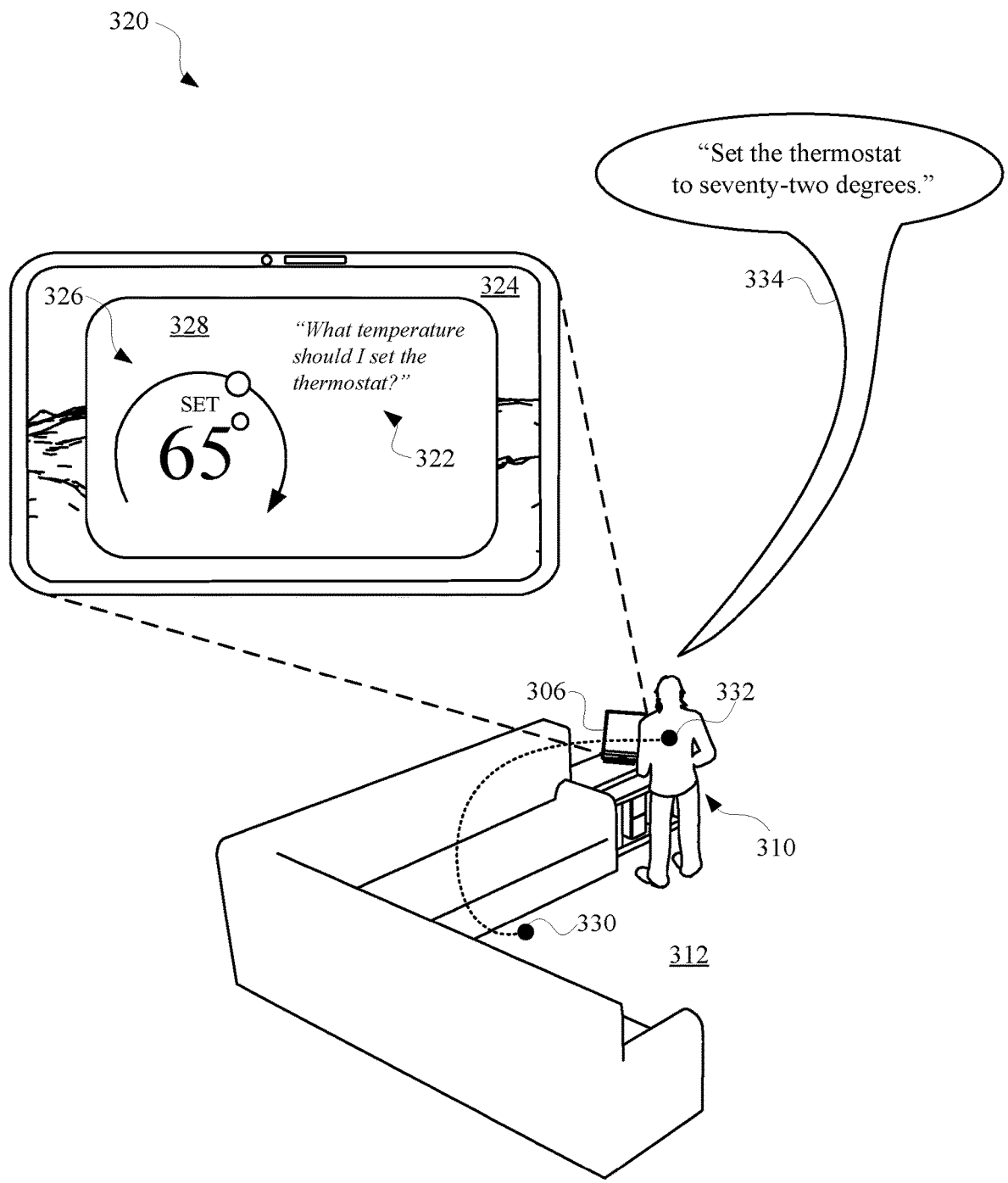
Figure 3C:
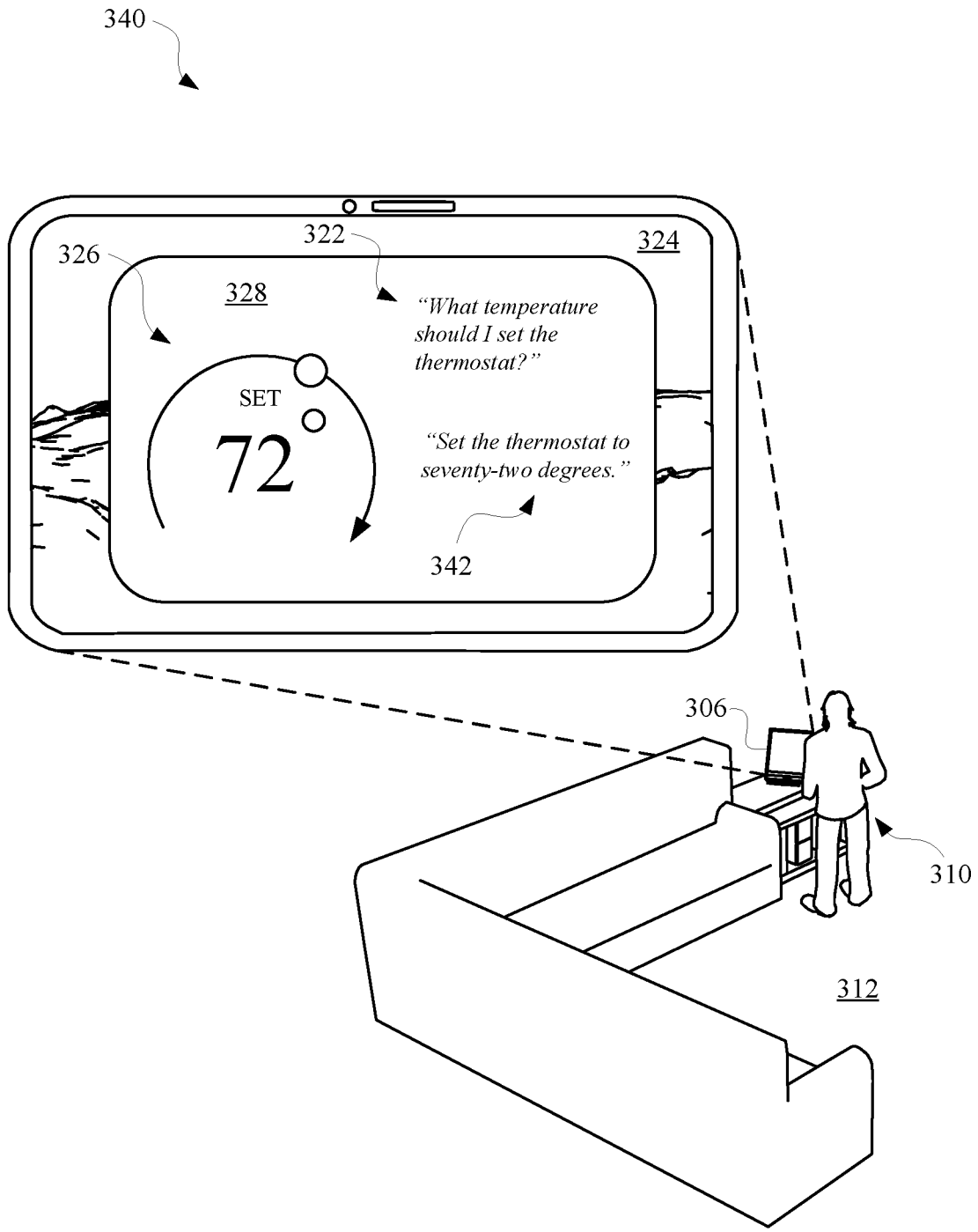

FIG. 3A, FIG. 3B, and FIG. 3C illustrate a scenario in which an automated assistant employs a trained machine learning model for determining when to be invoked and detect assistant commands, in lieu of requiring a spoken invocation phrase before being invoked. The automated assistant and/or a computing device 306 can use one or more trained machine learning models to process data that is based on inputs to one or more sensors that are connected to the computing device 306 and/or otherwise in communication with the computing device 306. Based on the processing of the data, the computing device 306 and/or the automated assistant can make a determination regarding whether to be invoked or not—without necessarily requiring a user 310 to explicitly speak an invocation phrase.

For example, FIG. 3A illustrates a view 300 of a user 310 seated in an environment 312 and listening to an output 302 from the computing device 306, which can be an assistant-enabled device. The user 310 can listen to the output 302 while sitting on their couch and facing a camera of the computing device 306. The computing device 306, with prior permission from the user 310, can process contextual data characterizing features of an environment 312 before during and/or after the user 310 was listening to the output 302 from the computing device 306. For example, the contextual data can characterize changes in position of the user 310 and/or gaze of the user 310. The user 310 can be in a first position 330 when the user 310 provided a spoken utterance to request playback of the "ambient nature sounds," and then reposition themselves to a second position 332 after providing the spoken utterance. Based on processing this contextual data, the automated assistant can determine a probability that the user 310 will request that the automated assistant perform an additional operation. When the probability indicates that the user 310 is more likely to provide the additional request than not provide the additional request, the automated assistant can bypass necessitating the user 310 provide a subsequent invocation phrase (e.g., "Hey, Assistant . . . ") before submitting a subsequent request. In other words, the contextual data can substitute for the invocation phrase, at least with prior permission from the user 310.

FIG. 3B illustrates a view 320 of the user 310 moving to a second position 332, and contextual data being processed using one or more trained machine learning models. Based on the processing of the contextual data that characterizes this scenario, the automated assistant can be invoked in order to detect and/or receive one or more subsequent assistant commands without necessitating a spoken invocation phrase from the user 310. In some implementations, the automated assistant can cause a display panel 324 of the computing device 306 to render an interface 328 that is predicted to be useful for any subsequent assistant commands from the user 310 in the current context. Additionally, or alternatively, the automated assistant can cause the display panel 324 to provide an indication (e.g., a graphic symbol) that the automated assistant is operating in a mode in which an invocation phrase is temporarily not required before being responsive to assistant commands from the user 310.

In some implementations, while the automated assistant is invoked and awaiting another assistant command from the user 310, the interface 328 can be rendered to include a control element 326 for controlling a thermostat, and a responsive output 322 from the automated assistant. The responsive output 322 can include natural language content that is generated based on processing of the contextual data using the trained machine learning model. For example, the natural language content of the responsive output 322 can characterize an inquiry associated with a predicted assistant command. For instance, the predicted assistant command can be a user request to change a setting of a thermostat, and the predicted assistant command can be identified based on processing the contextual data using the trained machine learning model. As a result, the responsive output 322 can include natural language content such as, "What temperature should I set the thermostat to?"

In some implementations, one or more actions can be assigned a probability based on processing of the contextual data using the trained machine learning model. An action with a highest assigned probability relative to the other assigned probabilities for other actions can be identified as an action that the user 310 will most likely request. Therefore, the natural language content of the responsive output 322 can be generated based on the highest probability action predicted to be requested.

Regardless of the responsive output 322, the user 310 can provide another spoken utterance 334 in order to control the automated assistant without initially providing a spoken invocation phrase. For example, the other spoken utterance 334 can be "Set the thermostat to seventy-two degrees," as illustrated in view 320 of FIG. 3B. In some implementations, the user 310 can provide a different spoken utterance that does not correspond to the predicted assistant command and that does not include the invocation phrase. For example, as a result of processing the contextual data that indicates an intention of the user 310 to control the automated assistant, the user 310 can provide an assistant command such as, "Turn off the kitchen lights." The automated assistant can be responsive to the spoken utterance 344 and/or a different spoken utterance despite the user 310 not providing a spoken invocation phrase. Rather, the contextual data characterizing the scenario FIG. 3A and FIG. 3B can substitute for the spoken invocation phrase and therefore serve to indicate the intention of the user to direct the automated assistant to perform one or more actions.

In response to receiving the other spoken utterance 334, the automated assistant can perform one or more actions based on the other spoken utterance 334. For example, as illustrated in view 340 of FIG. 3C, the automated assistant can cause a setting of the thermostat to change from an initial setting to a setting of 72 degrees, as specified by the user 310. In some implementations, acknowledgement of the other spoken utterance 334 can be provided through a particular modality that is selected based upon processing of the contextual data using the trained machine learning model. For example, one or more modalities and/or devices can be assigned a probability based on processing of the contextual data using the trained machine learning model. A modality and/or a device with a highest probability relative to other modalities and/or devices can be selected to acknowledge the other spoken utterance 334 from the user 310. For example, the automated assistant can cause the interface 328 to render the updated setting of the thermostat and the natural language content of the other spoken utterance 334 as additional graphical content 342 of the interface 328. In this way, interactions between the user 310 and the automated assistant can be streamlined in order to bypass necessitating invocation phrases and/or explicit inputs from the user directly to the automated assistant to indicate an intention to provide an assistant command.

In some implementations, when the automated assistant is operating in a mode for bypassing necessitating invocation phrases, the automated assistant may rely on speech-to-text processing and/or natural language understanding processing. Such processing can be relied upon in order to determine, with prior permission from the user, whether audio detected at one or more microphones embodies natural language content directed at the automated assistant. For example, based on the automated assistant entering the mode for bypassing necessitating an invocation phrase, an assistant-enabled computing device can process audio data embodied a spoken utterance from a user such as, "take out the trash." Using speech-to-text, the phrase "take out the trash" can be identified and further processed in order to determine whether the phrase is actionable by the automated assistant.

When the phrase is determined to be actionable, the automated assistant can initialize performance of one or more actions that are identified based on the phrase. However, when the phrase is determined to not be actionable by the automated assistant, the computing device can exit the mode and require an invocation phrase before responding to an assistant command from that particular user—although, depending on the contextual data, the automated assistant may be responsive to one or more other users when the contextual data is indicative of a scenario when the one or more other users are predicted to provide an invocation phrase to the automated assistant. Alternatively, when the phrase is determined to not be actionable by the automated assistant, the computing device can continue to operate in the mode, with prior permission from the user, until one or more users are determined to have provided an assistant command that is actionable by the automated assistant.

In some implementations, once the automated assistant is operating in the mode, for no longer necessitating an invocation phrase before being responsive to an assistant command, the automated assistant can rely on other data to determine whether to stay in the mode or transition out of the mode. For example, and with prior permission from the user, one or more sensors (e.g., a proximity sensor and/or other image-based camera) of one or more computing devices can be used to generate data that characterizes features of an environment. When one or more sensors provide data that is processed by the trained machine learning model and is indicative of a disinterest of the user for invoking the automated assistant (e.g., the user leaves a room, as detected by a passive infrared sensor), the automated assistant can transition out of the mode. However, when the one or more sensors provide data that is processed by one or more trained machine learning models and indicative of an intention of the user to invoke the automated assistant, the automated assistant can remain in the mode.

In some implementations, the contextual data characterizing features of one or more environments can be processed periodically to determine whether the automated assistant should enter the mode for no long necessitating an invocation phrase. For example, a computing device that provides access to the automated assistant can process, every T seconds and/or minutes, the contextual data. Based on this processing the computing device can cause the automated assistant to enter the mode or refrain from entering the mode. Additionally, or alternatively, the computing device can process sensor data from a first source (e.g., a proximity sensor) and, based on the processing, determine whether to process additional data for determining whether to enter the mode. For example, when the proximity sensor indicates that the user has entered a particular room, the computing device can employ a trained machine learning model to process additional contextual data. Based on the processing of contextual data, the computing device can determine that the current context is one in which the user would invoke the automated assistant, and then enter the mode for temporarily no longer necessitating an invocation phrase. However, when the proximity sensor does not indicate that the user has entered the particular room, the computing device (e.g., a client device or server device) can refrain from further processing contextual data using the machine learning model.

In some implementations, the computing device can provide an output that is perceivable by the user in order indicate whether the computing device and/or the automated assistant is operating in the mode. For example, the computing device or another computing device can be connected to an interface (e.g., a graphical interface, an audio interface, a haptic interface) that can provide an output in response to the automated assistant transitioning into the mode and/or the automated assistant transitioning out of the mode. In some implementations, the output can be an ambient sound (e.g., nature sounds), activation of a light, a vibration from a haptic feedback device, and/or any other type of output that can alert a user.

Figure 4:
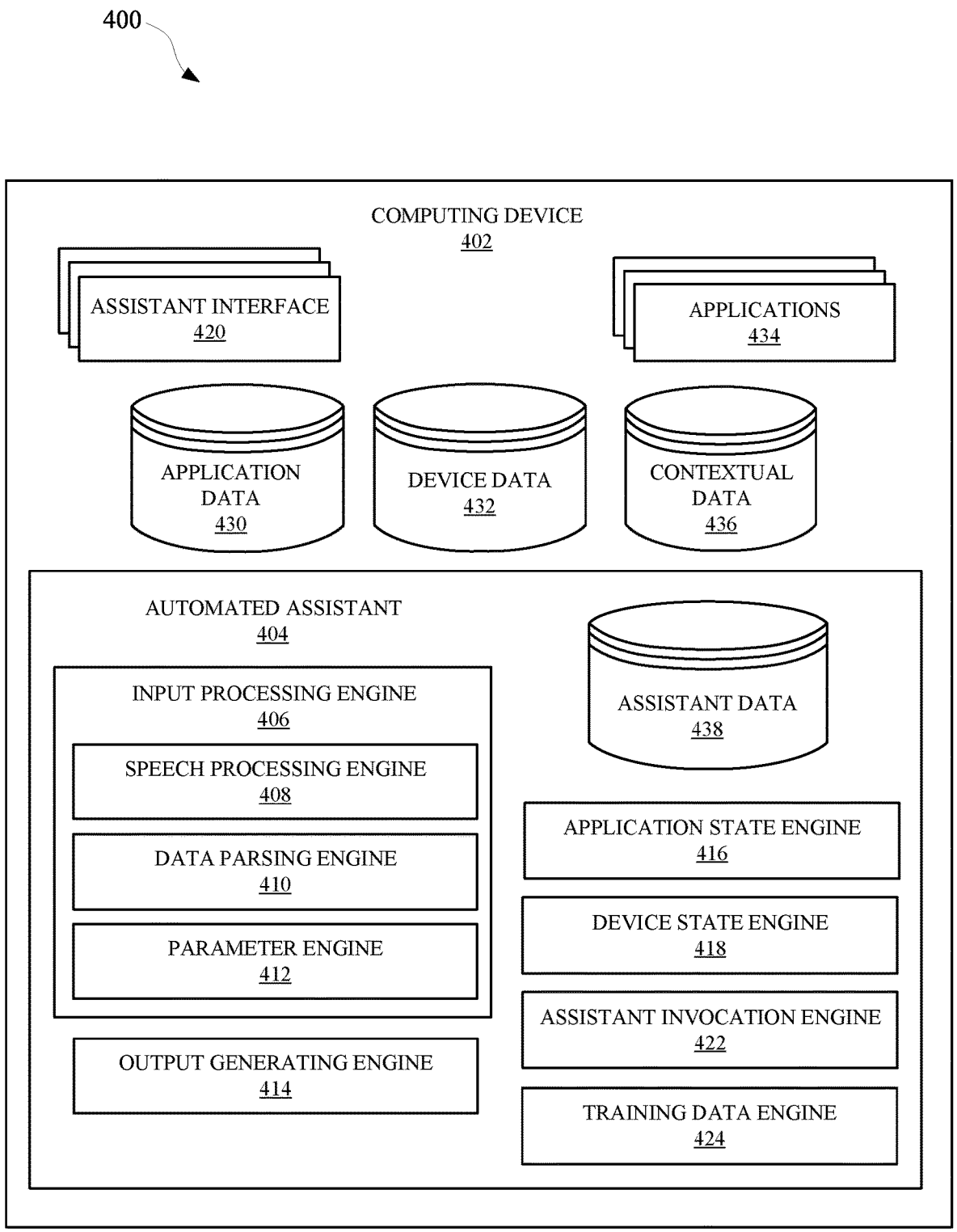
FIG. 4 illustrates a system for providing an automated assistant that can selectively determine whether to be invoked from contextual signals in lieu of necessitating a spoken invocation phrase to be initially detected.

FIG. 4 illustrates a system 400 for providing an automated assistant that can selectively determine whether to be invoked from contextual signals in lieu of necessitating a spoken invocation phrase to be invoked. The automated assistant 404 can operate as part of an assistant application that is provided at one or more computing devices, such as a computing device 402 and/or a server device. A user can interact with the automated assistant 404 via assistant interface(s) 420, which can be a microphone, a camera, a touch screen display, a user interface, and/or any other apparatus capable of providing an interface between a user and an application. For instance, a user can initialize the automated assistant 404 by providing a verbal, textual, and/or a graphical input to an assistant interface 420 to cause the automated assistant 404 to perform a function (e.g., provide data, control a peripheral device, access an agent, generate an input and/or an output, etc.). Alternatively, the automated assistant 404 can be initialized based on processing of contextual data 436 using one or more trained machine learning models. The contextual data 436 can characterize one or more features of an environment in which the automated assistant 404 is accessible, and/or one or more features of a user that is predicted to be intending to interact with the automated assistant 404. The computing device 402 can include a display device, which can be a display panel that includes a touch interface for receiving touch inputs and/or gestures for allowing a user to control applications 434 of the computing device 402 via the touch interface. In some implementations, the computing device 402 can lack a display device, thereby providing an audible user interface output, without providing a graphical user interface output. Furthermore, the computing device 402 can provide a user interface, such as a microphone, for receiving spoken natural language inputs from a user. In some implementations, the computing device 402 can include a touch interface and can be void of a camera, but can optionally include one or more other sensors.

The computing device 402 and/or other third party client devices can be in communication with a server device over a network, such as the internet. Additionally, the computing device 402 and any other computing devices can be in communication with each other over a local area network (LAN), such as a Wi-Fi network. The computing device 402 can offload computational tasks to the server device in order to conserve computational resources at the computing device 402. For instance, the server device can host the automated assistant 404, and/or computing device 402 can transmit inputs received at one or more assistant interfaces 420 to the server device. However, in some implementations, the automated assistant 404 can be hosted at the computing device 402, and various processes that can be associated with automated assistant operations can be performed at the computing device 402.

In various implementations, all or less than all aspects of the automated assistant 404 can be implemented on the computing device 402. In some of those implementations, aspects of the automated assistant 404 are implemented via the computing device 402 and can interface with a server device, which can implement other aspects of the automated assistant 404. The server device can optionally serve a plurality of users and their associated assistant applications via multiple threads. In implementations where all or less than all aspects of the automated assistant 404 are implemented via computing device 402, the automated assistant 404 can be an application that is separate from an operating system of the computing device 402 (e.g., installed "on top" of the operating system)—or can alternatively be implemented directly by the operating system of the computing device 402 (e.g., considered an application of, but integral with, the operating system).

In some implementations, the automated assistant 404 can include an input processing engine 406, which can employ multiple different modules for processing inputs and/or outputs for the computing device 402 and/or a server device. For instance, the input processing engine 406 can include a speech processing engine 408, which can process audio data received at an assistant interface 420 to identify the text embodied in the audio data. The audio data can be transmitted from, for example, the computing device 402 to the server device in order to preserve computational resources at the computing device 402. Additionally, or alternatively, the audio data can be exclusively processed at the computing device 402.

The process for converting the audio data to text can include a speech recognition algorithm, which can employ neural networks, and/or statistical models for identifying groups of audio data corresponding to words or phrases. The text converted from the audio data can be parsed by a data parsing engine 410 and made available to the automated assistant 404 as textual data that can be used to generate and/or identify command phrase(s), intent(s), action(s), slot value(s), and/or any other content specified by the user. In some implementations, output data provided by the data parsing engine 410 can be provided to a parameter engine 412 to determine whether the user provided an input that corresponds to a particular intent, action, and/or routine capable of being performed by the automated assistant 404 and/or an application or agent that is capable of being accessed via the automated assistant 404. For example, assistant data 438 can be stored at the server device and/or the computing device 402, and can include data that defines one or more actions capable of being performed by the automated assistant 404, as well as parameters necessary to perform the actions. The parameter engine 412 can generate one or more parameters for an intent, action, and/or slot value, and provide the one or more parameters to an output generating engine 414. The output generating engine 414 can use the one or more parameters to communicate with an assistant interface 420 for providing an output to a user, and/or communicate with one or more applications 434 for providing an output to one or more applications 434.

In some implementations, the automated assistant 404 can be an application that can be installed "on-top of" an operating system of the computing device 402 and/or can itself form part of (or the entirety of) the operating system of the computing device 402. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 402. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 402 can include one or more applications 434 which can be provided by a third-party entity that is different from an entity that provided the computing device 402 and/or the automated assistant 404. An application state engine 416 of the automated assistant 404 and/or the computing device 402 can access application data 430 to determine one or more actions capable of being performed by one or more applications 434, as well as a state of each application of the one or more applications 434 and/or a state of a respective device that is associated with the computing device 402. A device state engine 418 of the automated assistant 404 and/or the computing device 402 can access device data 432 to determine one or more actions capable of being performed by the computing device 402 and/or one or more devices that are associated with the computing device 402. Furthermore, the application data 430 and/or any other data (e.g., device data 432) can be accessed by the automated assistant 404 to generate contextual data 436, which can characterize a context in which a particular application 434 and/or device is executing, and/or a context in which a particular user is accessing the computing device 402, accessing an application 434, and/or any other device or module.

While one or more applications 434 are executing at the computing device 402, the device data 432 can characterize a current operating state of each application 434 executing at the computing device 402. Furthermore, the application data 430 can characterize one or more features of an executing application 434, such as content of one or more graphical user interfaces being rendered at the direction of one or more applications 434. Alternatively, or additionally, the application data 430 can characterize an action schema, which can be updated by a respective application and/or by the automated assistant 404, based on a current operating status of the respective application. Alternatively, or additionally, one or more action schemas for one or more applications 434 can remain static, but can be accessed by the application state engine 416 in order to determine a suitable action to initialize via the automated assistant 404.

The computing device 402 can further include an assistant invocation engine 422 that can use one or more trained machine learning models to process application data 430, device data 432, contextual data 436, and/or any other data that is accessible to the computing device 402. The assistant invocation engine 422 can process this data in order to determine whether or not to wait for a user to explicitly speak an invocation phrase to invoke the automated assistant 404, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training that characterizes contexts in which the user invokes the automated assistant and other contexts in which the user does not invoke the automated assistant. When the one or more trained machine learning models are trained according to these instances of training data, the assistant invocation engine 422 can cause the automated assistant 404 to detect, or bypass detecting, spoken invocation phrases from a user based on features of a context and/or an environment. Additionally, or alternatively, the assistant invocation engine 422 can cause the automated assistant 404 to detect, or bypass detecting for one or more assistant commands from a user based on features of a context and/or an environment.

In some implementations, the automated assistant 404 can optionally include a training data engine 424 for generating training data, with prior permission from the user, based on interactions between the automated assistant 404 and the user. The training data can characterize instances in which the automated assistant 404 may have initialized without being explicitly invoked via a spoken invocation phrase, and thereafter the user either provided an assistant command and/or did not provide an assistant command within a threshold period of time. In some implementations, the training data can be shared, with prior permission from the user, with a remote server device that also receives data from a variety of different computing devices associated with other users. In this way, one or more trained machine learning models can be further trained in order that each respective automated assistant can employ a further trained machine learning model to better assist the user, while also preserving computational resources.

Figure 5:
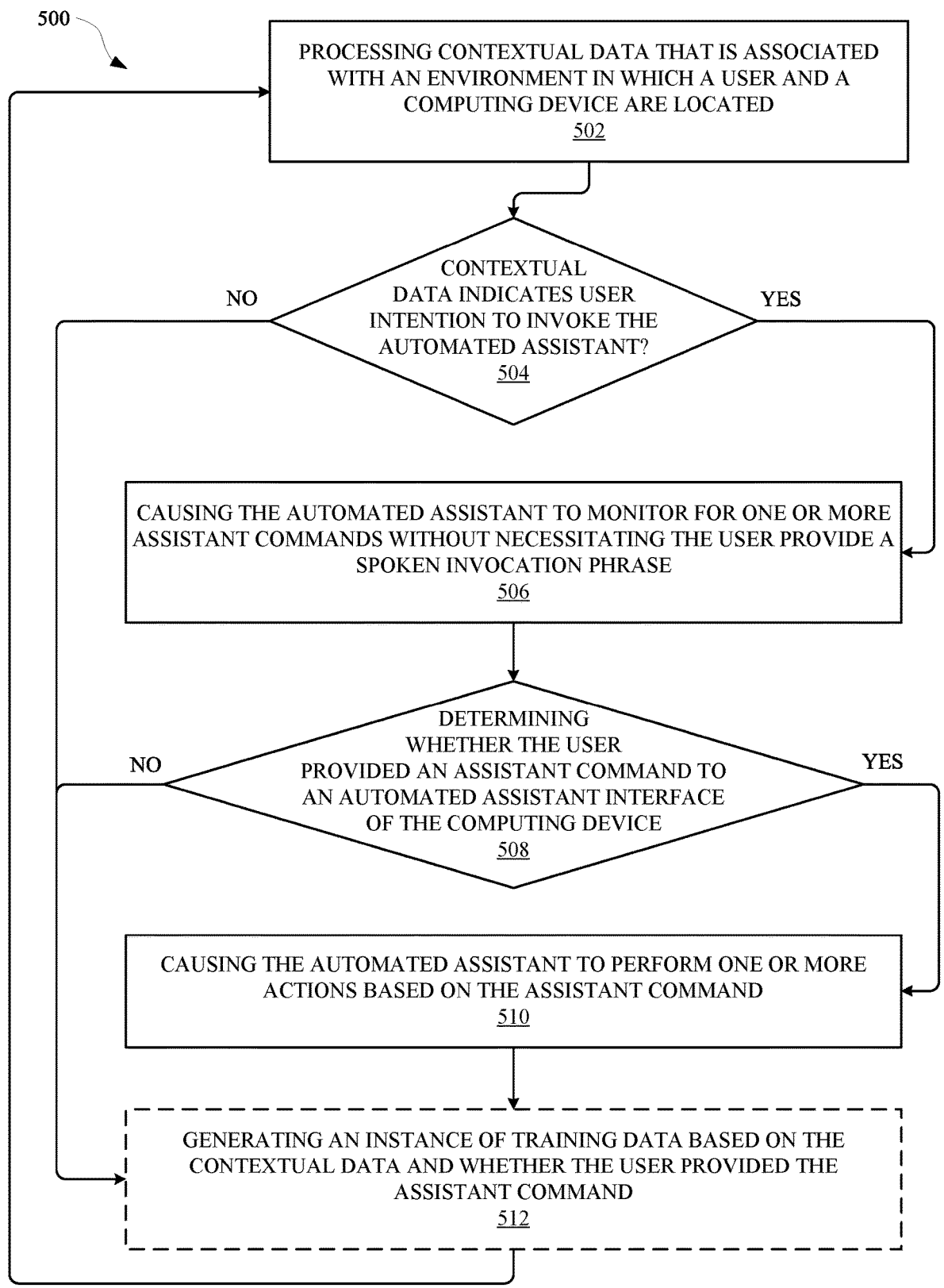
FIG. 5 illustrates a method for selectively bypassing invocation phrase detection buy an automated assistant based on contextual signals.

FIG. 5 illustrates a method 500 for selectively bypassing invocation phrase detection by an automated assistant based on contextual signals. The method 500 can be performed by one or more computing devices, applications, and/or any other apparatus or module capable of interacting with an automated assistant. The method 500 can include an operation 502 of processing contextual data that is associated with an environment in which a user and a computer device are located. For example, the environment can be a home of the user and the contextual data can be generated based on signals from one or more sensors, applications, and/or apparatuses, that are in communication with the computer device. The sensors can be, but are not limited to, a proximity sensor, an infrared sensor, a camera, a LIDAR device, a microphone, a motion sensor, a weight sensor, a force sensor, an accelerometer, a high pressure sensor, a temperature sensor, and/or any other apparatus or module that can be responsive to direct or indirect interactions with a user.

The method 500 can further include an operation 502 of determining whether the contextual data indicates an intention of the user to invoke the automated assistant. In some implementations, the contextual data can characterize one of our operating states of one or more respective computing devices and/or applications. For example, the contextual data can indicate that a first computing device is operating a first application and a second computing device, which is different from the first computing device, is operating a second application that is different from the first application. For instance, the first computing device can be a standalone speaker that is playing music via a first application, and the second computing device can be a thermostat that is operating according to a low energy schedule and/or mode. Therefore, the contextual data can characterize these operating states of these devices.

When the contextual data indicates the user intends to invoke the automated assistant, the method 500 can transition from the operation 504 to the operation 506. However, when the contextual data does not indicate that the user intends to invoke the automated assistant, the method 500 can proceed from the operation 504 to an optional operation 512 and/or the operation 502. The operation 506 can include causing, based on processing the contextual data, the automated assistant to detect one or more assistant commands without necessitating the user providing a spoken invocation phrase. For example, based on the contextual data indicating that the user intends to invoke the automated assistant, a computing device that provides access to the automated assistant can bypass buffering and/or processing audio data in furtherance of determining whether the user provided a spoken invocation phrase. Such operations may be performed at one or more subsystems of a computing device while one or more other subsystems of the computing device operate in a low-power mode. When the user is predicted to be intending to invoke the automated assistant, the computing device can transition out of the low-power mode in order to activate the one or more other subsystems for processing audio data that embodies one or more assistant commands from the user.

The method 500 can proceed from the operation 506 to an operation 508 of determining whether the user provided an assistant command to an automated assistant interface of the computing device. The automated assistant interface of the computing device can include one or more microphones, one or more cameras, and/or any other apparatus or module capable of receiving inputs from the user. When the automated assistant determines that the user provided one or more assistant commands to the automated assistant interface, the method 500 can proceed from the operation 508 to an operation 510. However, when the automated assistant does not determine that the user provided an assistant command within a threshold period of time, the method 500 can proceed from the operation 508 to the optional operation 512 and/or the operation 502. The operation 510 can include causing the automated assistant to perform one or more actions based on the one or more assistant commands provided by the user. For example, the one or more actions can be actions performed by the automated assistant, the computing device, a separate computing device, one or more applications, and/or any other apparatus or module capable of interacting with the automated assistant.

The method 500 can optionally proceed from the operation 510 to the optional operation 512. The operation 512 can include generating an instance of training data based on the contextual data and whether the user provided the assistant command. This training data can be shared with prior permission from the user in order to train one or more machine learning models in order to improve probability determinations regarding whether the user is intending to invoke an automated assistant or not. In some implementations, one or more trained machine learning models can be trained at a remote server device that is in communication with a variety of different automated assistants that interact with various different users. Training data generated according to interactions between different users and different automated assistants can be used to train one or more machine learning models periodically. The trained machine learning models can then be downloaded by computing devices that provide access to the automated assistants in order to improve functionality of those automated assistants, thereby improving efficiency of the computing device and/or any other associated applications and devices.

For example, by improving ability to determine whether a user is intending to invoke an automated assistant or not, the computing device can preserve computational resources that would otherwise be expended on processing and buffering audio data for determining whether an invocation phrase has been detected. Furthermore, certain computing devices can mitigate wasting of power by less frequently activating processors when transitioning between detecting invocation phrases and detecting assistant commands. For example, rather than running a subsystem after a user interacts with the computing device, the computing device subsystem can throttle the subsystem based on a determination that the user may not intend to further interact with the automated assistant anytime soon.

Figure 6:
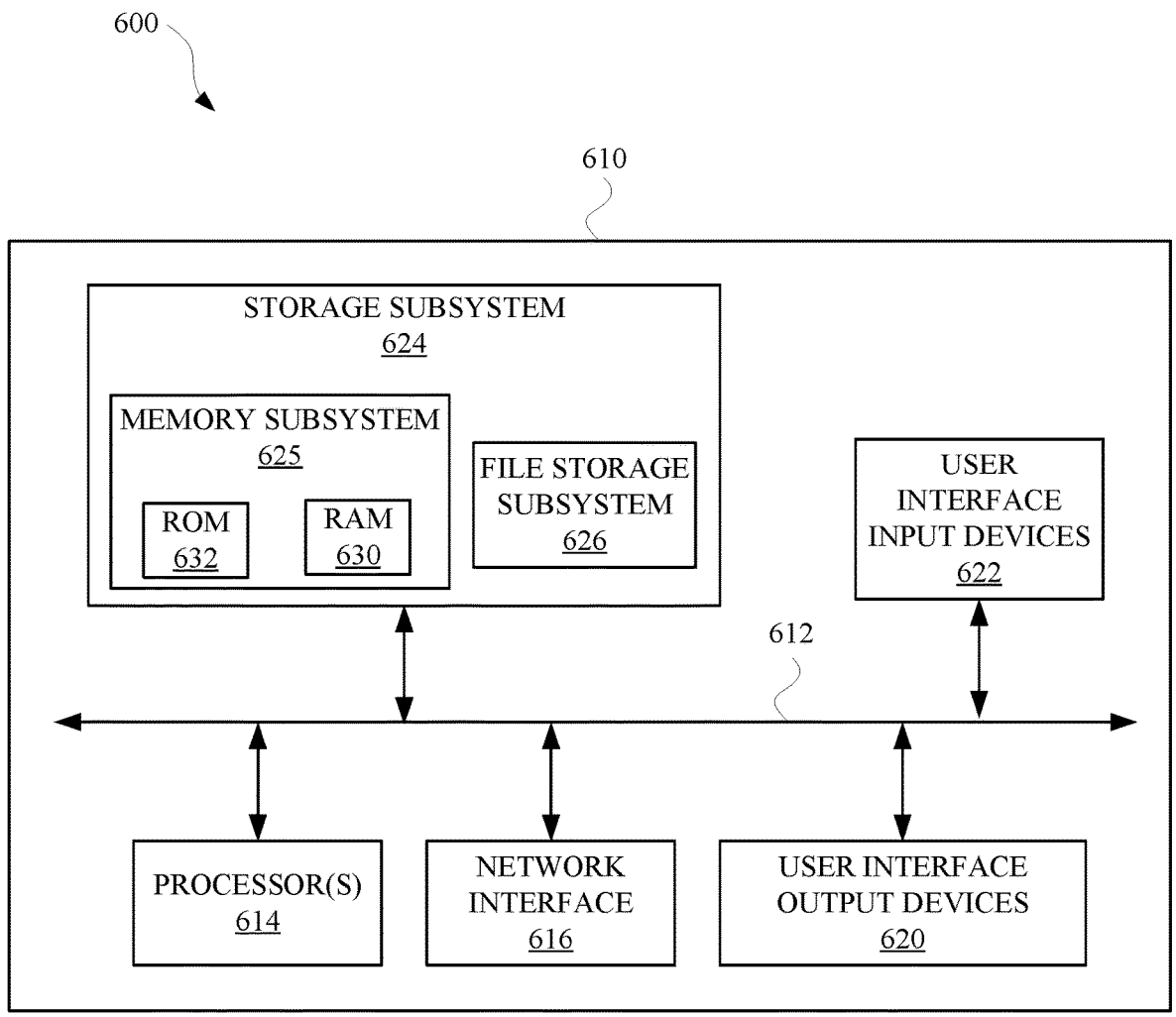
FIG. 6 is a block diagram of an example computer system.

FIG. 6 is a block diagram 600 of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more of system 400, computing device 106, computing device 206, computing device 306, and/or any other application, device, apparatus, and/or module discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as processing contextual data that is associated with an environment in which a user and a computing device are located, wherein the computing device provides access to an automated assistant that is responsive to natural language input from the user, wherein processing of the contextual data is performed independent of whether the user provided an invocation phrase, and wherein processing of the contextual data is performed using a trained machine learning model that is trained using instances of training data that are based on previous interactions between one or more users and one or more automated assistants. The method can further include an operation of causing, based on processing the contextual data, the automated assistant to detect one or more assistant commands being provided by the user, wherein the automated assistant detects the one or more assistant commands being provided by the user in lieu of the automated assistant necessitating that the user provide an invocation phrase to the automated assistant, and wherein the automated assistant detects the one or more assistant commands independent of whether the user provided the invocation phrase to the automated assistant. The method can further include an operation of determining, based on causing the automated assistant detect the one or more assistant commands, that the user provided an assistant command to an automated assistant interface of the computing device, wherein the user provided the assistant command without explicitly providing the invocation phrase. The method can further include an operation of causing, in response to determining that the user provided the assistant command, the automated assistant to perform one or more actions based on the assistant command.

In some implementations, at least one of the instances of the training data is further based on data that characterizes one or more previous states of one or more respective computing devices that are present in the environment. In some implementations, the at least one instance of the training data is further based on other data that indicates the user provided a particular assistant command while the one or more respective computing devices were exhibiting the one or more previous states. In some implementations, the contextual data characterizes one or more current states of the one or more respective computing devices that are present in the environment. In some implementations, causing the automated assistant to detect one or more assistant commands being provided by the user includes: causing the computing device to bypass processing audio data to determine whether the invocation phrase was provided by the user. In some implementations, the method can further include an operation of causing, based on processing the contextual data, one or more computing devices in the environment to render an output that includes natural language content identifying an inquiry from the automated assistant to the user.

In some implementations, the natural language content identifying the inquiry is based on an anticipated assistant command selected by the automated assistant. In some implementations, the method can further include an operation of determining, based on processing the contextual data, one or more anticipated assistant commands, wherein the one or more anticipated assistant commands include the anticipated assistant command, and wherein at least the one instance of the training data is based on the interaction in which the automated assistant also responded to the anticipated assistant command. In some implementations, the anticipated assistant command corresponds to one or more particular actions that, when executed by the automated assistant, cause the automated assistant to control one or more other computing devices that are associated with the user. In some implementations, the contextual data is void of data that characterizes any invocation phrase provided by the user.

In some implementations, causing the automated assistant to detect one or more assistant commands being provided by the user includes: performing speech-to-text processing on captured audio data that is generated using one or more microphones connected to the computing device, wherein the speech-to-text processing is inactive when the automated assistant is no longer detecting one or more assistant commands. In some implementations, causing the automated assistant to detect one or more assistant commands being provided by the user includes: determining whether captured audio data, that is generated using one or more microphones connected to the computing device, embodies natural language content that identifies one or more actions capable of being performed by the automated assistant, wherein determining whether the natural language content identifies one or more actions is no longer performed when the automated assistant is no longer detecting one or more assistant commands. In some implementations, the method can further include an operation of causing, based on processing the contextual data, the computing device to render an output indicating that the computing device is operating to detect one or more assistant commands from the user. In some implementations, at least one instance of the training data is based on an interaction in which the automated assistant responded to an input from the user or another user.

In other implementations, a method implemented by one or more processors is set forth as including operations such as determining, at a computing device, that a user provided an invocation phrase and an assistant command to an automated assistant interface of the computing device, wherein the computing device provides access to an automated assistant that is responsive to natural language input from the user. The method can further include an operation of causing, in response to determining that the user provided the invocation phrase and the assistant command, the automated assistant to perform one or more actions that are based on the assistant command. The method can further include an operation of processing contextual data that is associated with an environment in which the user provided the invocation phrase and the assistant command, wherein the contextual data is processed using a trained machine learning model that is trained using instances of training data that are based on previous interactions between one or more users and one or more automated assistants, and wherein at least one instance of the training data is based on an interaction in which a particular automated assistant responded, within a threshold period of time, to multiple invocation phrases that were spoken by a particular user in another environment. The method can further include an operation of, subsequent to determining that the user provided the invocation phrase and the assistant command: causing, based on processing the contextual data, the automated assistant to detect one or more subsequent assistant commands being provided by the user in lieu of the computing device requiring the user to provide a subsequent invocation phrase in order to respond to the one or more subsequent assistant commands. The method can further include an operation of determining that the user provided an additional assistant command, and causing, in response to determining that the user provided the additional assistant command, the automated assistant to perform one or more additional actions based on the additional assistant command and without the user providing the subsequent invocation phrase.

In some implementations, the at least one instance of the training data is further based on data that characterizes one or more states of one or more respective computing devices that are present in the other environment. In some implementations, the at least one instance of the training data is further based on other data that indicates the one or more users provided a particular assistant command while the one or more other computing devices were exhibiting the one or more states. In some implementations, the contextual data characterizes one or more current states of the one or more respective computing devices that are present in the environment. In some implementations, causing the automated assistant to determine whether one or more subsequent assistant commands are being provided by the user includes: causing the computing device to bypass processing audio data to determine whether the invocation phrase was provided by the user.

In some implementations, the method can further include an operation of causing, based on processing the contextual data and the assistant command, one or more respective computing devices in the environment to render an output that includes natural language content identifying an inquiry from the automated assistant to the user. In some implementations, the natural language content identifying the inquiry corresponds an anticipated assistant command. In some implementations, the method can further include an operation of determining, based on processing the contextual data, one or more anticipated assistant commands, wherein the one or more anticipated assistant commands include the anticipated assistant command, and wherein at least the one instance of the training data is based on the interaction in which the particular automated assistant also responded to the anticipated assistant command. In some implementations, the one or more additional actions, when executed by the automated assistant, cause the automated assistant to control one or more other computing devices that are located in the environment.

In yet other implementations, a method implemented by one or more processors is set forth as including operations such as processing contextual data that is associated with an environment in which a user is present with a computing device that provides access to an automated assistant, wherein the contextual data is processed using a trained machine learning model that is trained using instances of training data that are based on previous interactions between one or more users and one or more automated assistants, and wherein at least one instance of the training data is based on an interaction in which a particular automated assistant responded, within a threshold period of time, to one or more assistant commands provided by a particular user in the environment or another environment. The method can further include an operation of causing, based on processing the contextual data, the computing device or another computing device in the environment to render an output that characterizes an inquiry from the automated assistant to the user. The method can further include an operation of determining, subsequent to the output being rendered at the computing device or the other computing device, that the user provided an assistant command to an automated assistant interface of the computing device or the other computing device, wherein the user provides the assistant command without initially providing the invocation phrase. The method can further include an operation of causing, in response to determining that the user provided the assistant command, the automated assistant to perform one or more actions based on the assistant command. In some implementations, the contextual data characterizes: one or more applications executing at the computing device or the other computing device, and one or more features of a physical position of the user relative to the computing device or the other computing device.

In yet other implementations, a method implemented by one or more processors is set forth as including operations such as determining that a user provided an invocation phrase and an assistant command to an automated assistant interface of a computing device, wherein the computing device provides access to an automated assistant that is responsive to natural language input from the user. The method can further include an operation of causing, in response to determining that the user provided the invocation phrase and the assistant command, the automated assistant to perform one or more actions that are based on the assistant command. The method can further include an operation of generating, based on the assistant command being provided by the user, first training data that provides a correlation between the user providing the assistant command, and first contextual data that characterizes an environment in which the user provided the assistant command. The method can further include an operation of determining, before or after the automated assistant performs the one or more actions, that the user did not provide an additional assistant command when the user was present in a separate environment that includes one or more different features from the environment, wherein the separate environment includes the computing device or another computing device that provides access to the automated assistant. The method can further include an operation of generating, based on determining that the user did not providing the additional assistant command in the separate environment, second training data that provides an additional correlation between the user not providing the additional assistant command and second contextual data characterizing the separate environment. The method can further include an operation of causing one or more machine learning models to be trained using the first training data and the second training data.

In some implementations, the first contextual data one or more states of one or more computing devices that are present in the environment. In some implementations, the first contextual data indicates one or more users were positioned in the environment when the user provided the assistant command. In some implementations, the second contextual data characterizes one or more other states of one or more other computing devices that are present in the separate environment. In some implementations, the second contextual data indicates one or more users provided a particular assistant command while the one or more other computing devices were exhibiting the one or more other states. In some implementations, the environment and the separate environment correspond a common geographic location.

We claim:

1. A method implemented by one or more processors, the method comprising:

processing contextual data that is associated with an environment in which a user and a computing device are located,
  wherein the computing device provides access to an automated assistant that is responsive to natural language input from the user,
  wherein processing of the contextual data is performed independent of whether the user provided an invocation phrase,
  wherein processing of the contextual data is performed using a trained machine learning model that is trained using instances of training data that are based on previous interactions between one or more users and one or more automated assistants, and
  wherein the contextual data includes data characterizing a current state of the computing device and an additional current state of an additional computing device, wherein the additional computing device is different from the computing device, wherein the current state of the computing device is different than the additional current state of the additional computing device, and wherein the additional computing device is located in the environment in which the user and the computing device are located;

in response to processing the contextual data, including processing of the data that characterizes the current state of the computing device and the additional current state of the additional computing device, determining to bypass requiring explicit invocation of the automated assistant at the computing device, wherein determining to bypass requiring explicit invocation of the automated assistant at the computing device is based at least in part on a previous instance of the user providing a previous assistant command to the automated assistant when the computing device was operating in the current state and the additional computing device was operating in the additional current state;

causing, based on determining to bypass requiring explicit invocation of the automated assistant, the automated assistant to detect one or more assistant commands being provided by the user,
  wherein the automated assistant detects the one or more assistant commands being provided by the user in lieu of the automated assistant necessitating that the user provide an invocation phrase to the automated assistant, and
  wherein the automated assistant detects the one or more assistant commands independent of whether the user provided the invocation phrase to the automated assistant;

determining, based on causing the automated assistant to detect the one or more assistant commands, that the user provided an assistant command to an automated assistant interface of the computing device,
  wherein the user provided the assistant command without explicitly providing the invocation phrase; and causing, in response to determining that the user provided the assistant command, the automated assistant to perform one or more actions based on the assistant command.

2. The method of claim 1, wherein at least one of the instances of the training data is further based on data that characterizes one or more previous states of one or more respective computing devices that are present in the environment.

3. The method of claim 2, wherein the at least one instance of the training data is further based on other data that indicates the user provided a particular assistant command while the one or more respective computing devices were exhibiting the one or more previous states.

4. The method of claim 1, further comprising:
causing, based on processing the contextual data, one or more computing devices in the environment to render an output that includes natural language content identifying an inquiry from the automated assistant to the user.

5. The method of claim 4, wherein the natural language content identifying the inquiry is based on an anticipated assistant command selected by the automated assistant.

6. The method of claim 5, further comprising:
determining, based on processing the contextual data, one or more anticipated assistant commands,
wherein the one or more anticipated assistant commands include the anticipated assistant command, and
wherein at least one of the instances of the training data is based on an interaction, of the previous interactions in which the automated assistant also responded to the anticipated assistant command.

7. The method of claim 1, wherein the contextual data further includes additional data indicating a further current state of a further computing device that is different from the computing device and that is different from the additional computing device.

8. A client device comprising one or more processors executing locally stored instructions to:
process contextual data that is associated with an environment in which a user and a computing device are located,
wherein the computing device provides access to an automated assistant that is responsive to natural language input from the user,
wherein processing of the contextual data is performed independent of whether the user provided an invocation phrase,
wherein processing of the contextual data is performed using a trained machine learning model that is trained using instances of training data that are based on previous interactions between one or more users and one or more automated assistants, and
wherein the contextual data includes data characterizing a current state of the computing device and an additional current state of an additional computing device, wherein the additional computing device is different from the computing device, wherein the current state of the computing device is different than the additional current state of the additional computing device, and wherein the additional computing device is located in the environment in which the user and the computing device are located;
in response to processing the contextual data, including processing of the data that characterizes the current state of the computing device and the additional current state of the additional computing device, determine to bypass requiring explicit invocation of the automated assistant at the computing device, wherein determining to bypass requiring explicit invocation of the automated assistant at the computing device is based at least in part on a previous instance of the user providing a previous assistant command to the automated assistant when the computing device was operating in the current state and the additional computing device was operating in the additional current state;
cause, based on determining to bypass requiring explicit invocation of the automated assistant, the automated assistant to detect one or more assistant commands being provided by the user,
wherein the automated assistant detects the one or more assistant commands being provided by the user in lieu of the automated assistant necessitating that the user provide an invocation phrase to the automated assistant, and
wherein the automated assistant detects the one or more assistant commands independent of whether the user provided the invocation phrase to the automated assistant;
determine, based on causing the automated assistant to detect the one or more assistant commands, that the user provided an assistant command to an automated assistant interface of the computing device,
wherein the user provided the assistant command without explicitly providing the invocation phrase; and
cause, in response to determining that the user provided the assistant command, the automated assistant to perform one or more actions based on the assistant command.

9. The client device of claim 8, wherein at least one of the instances of the training data is further based on data that characterizes one or more previous states of one or more respective computing devices that are present in the environment.

10. The client device of claim 9, wherein the at least one instance of the training data is further based on other data that indicates the user provided a particular assistant command while the one or more respective computing devices were exhibiting the one or more previous states.

11. The client device of claim 8, wherein one or more of the processors, in executing the locally stored instructions, are further to:
cause, based on processing the contextual data, one or more computing devices in the environment to render an output that includes natural language content identifying an inquiry from the automated assistant to the user.

12. The client device of claim 11, wherein the natural language content identifying the inquiry is based on an anticipated assistant command selected by the automated assistant.

13. The client device of claim 12, wherein one or more of the processors, in executing the locally stored instructions, are further to:
determine, based on processing the contextual data, one or more anticipated assistant commands,
wherein the one or more anticipated assistant commands include the anticipated assistant command, and
wherein at least one of the instances of the training data is based on an interaction, of the previous interactions in which the automated assistant also responded to the anticipated assistant command.

* * * * *